J. F. LIEB.
AUTOMOBILE TIRE.
APPLICATION FILED FEB. 6, 1911.
1,019,973.
Patented Mar. 12, 1912.
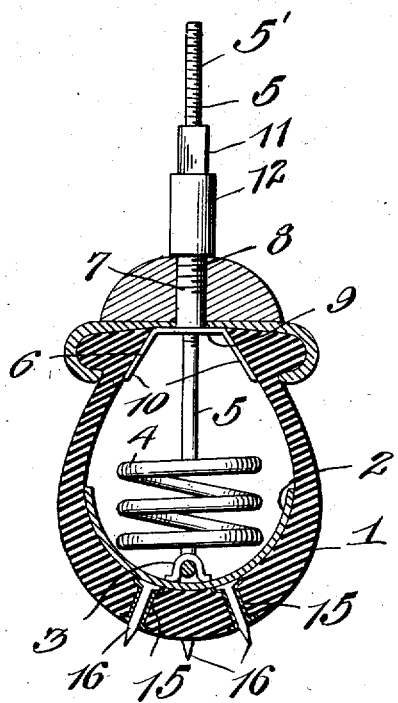
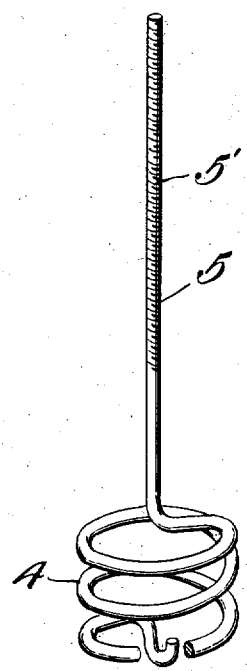
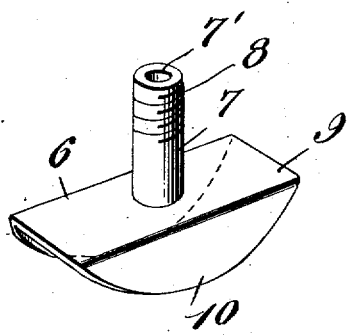
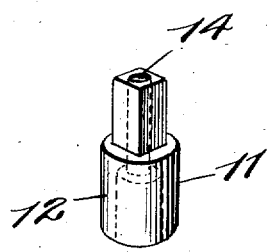
Witnesses
Chas. L. Griesbauer.
H. E. Coleman.
Inventor
John F. Lieb,
By Watson E. Coleman.
Attorney

UNITED STATES PATENT OFFICE.

JOHN F. LIEB, OF PHILADELPHIA, PENNSYLVANIA.

AUTOMOBILE-TIRE.

1,019,973. Specification of Letters Patent. Patented Mar. 12, 1912.

Application filed February 6, 1911. Serial No. 606,966.

*To all whom it may concern:*

Be it known that I, JOHN F. LIEB, a citizen of the United States, residing at Philadelphia, in the county of Philadelphia and State of Pennsylvania, have invented certain new and useful Improvements in Automobile-Tires, of which the following is a specification, reference being had to the accompanying drawings.

My invention relates to new and useful improvements in automobile tires and more particularly to a spring tire for any design of vehicle, and has for its object to dispense with the inner tubes now used in tires, thereby preventing blowouts and punctures of the inner tube, and also greatly lengthening the life of mileage of tires as well as take up the jars and shocks caused by rough roads.

Another object resides in novel means for securing the tire to the rim of the wheel.

A further object of my invention is to produce a tire of this character, which will possess advantages in points of efficiency, durability, is inexpensive of manufacture, at the same time being extremely simple in construction.

With the foregoing and other objects in view the invention consists in the novel arrangement and combination of parts hereinafter described, pointed out in the claim and shown in the accompanying drawings in which—

Figure 1 is a transverse sectional view through my improved tire. Fig. 2 is a detail view of the spring used therein, and Figs. 3 and 4 are detail perspective views of the clenching member and the double acting nut.

Referring more particularly to the drawings 1 indicates the tire or casing having an inner shoe 2 placed therein to help preserve the shape of and protect the casing 1. Disposed in the tire and having one end secured to the shoe 2 by means of a clip 3 is a heavy coil spring 4, the other end of said coil spring extending upwardly forming an upright portion 5, and provided with the left hand threads 5′, the ends of the spring are to terminate at opposite sides of the coils.

In securing the tire to the rim of the wheel a clamping member 6 is employed, said member comprising a stem 7, having a central opening 7′ therein and provided with the right hand threads 8 and a base portion 9 provided with outwardly and downwardly projecting flanges 10. A double acting nut 11 is provided having a circular portion 12 provided with interior right hand threads to engage the threads 8 of the stem 7, the other end of the nut is rectangular and provided with interior left hand threads 14 adapted to engage the threads 5′ of the upper end 5 of the spring.

In securing the tire to the rim the metal shoe is first placed in the outer rubber tire, the spring is then placed in the tire and its end secured down by the clip 3, the clamp is then slipped down over the end 5 and placed in position in the tire, the rim is then placed in position, said rim is provided with openings through which the stem 7 of the clamp 6 is drawn, the double acting nut is screwed down on the upper end 5 of the spring, the stem 7 is then brought up to engage in the lower end of the nut and as the nut 11 is turned it will tend to draw upward on the clamping member thus clamping the tire securely to the wheel and making a cushion effect. The double acting nut 11 not only serves to hold the spring 4 in position but securely clamps the tire to the casing through the stem 7 and the clamp 6, thus forming a very simple and effective means for fastening the casing to the tire.

The outer casing 1 is provided with a plurality of openings in which are rigidly secured the copper eyelets 15 into which are forced the steel spikes 16, said spikes being held in place by the metal shoe 3, said shoe being held in place by means of the spring 4.

While I have shown and described the preferred form of my invention it will be obvious that various changes in the details of construction and in the proportions may be resorted to for successfully carrying the invention into practice without sacrificing any of the novel features or departing from the scope thereof.

Having thus described the invention what is claimed is:

In a spring tire, the combination of a casing having a metal shoe disposed therein, a coil spring arranged in the casing having one end secured to the shoe, the other end extending upwardly and provided with left hand screw threads, a clamping member slidably mounted on said upwardly extending end, said clamping member comprising a hollow stem having right hand threads formed on its exterior, a base for said stem, outwardly and downwardly extending flanges formed on said base, and a double acting nut engaged upon the stem of said clamping member and on the upwardly extending end of the spring to clamp the tire securely to the rim.

JOHN F. LIEB.

Witnesses:
 MAYME KAHLER,
 CARL LIEB.

Copies of this patent may be obtained for five cents each, by addressing the " Commissioner of Patents, Washington, D. C."